United States Patent
Zhang et al.

(10) Patent No.: US 9,398,166 B2
(45) Date of Patent: Jul. 19, 2016

(54) METHOD AND DEVICE OF COMMUNICATING PAGING AREA INFORMATION

(75) Inventors: Huiying Zhang, Beijing (CN); Ying Zhang, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 97 days.

(21) Appl. No.: 14/240,676

(22) PCT Filed: Jul. 26, 2012

(86) PCT No.: PCT/CN2012/079196
§ 371 (c)(1),
(2), (4) Date: Apr. 25, 2014

(87) PCT Pub. No.: WO2013/026342
PCT Pub. Date: Feb. 28, 2013

(65) Prior Publication Data
US 2015/0296088 A1    Oct. 15, 2015

(30) Foreign Application Priority Data
Aug. 23, 2011    (CN) .......................... 2011 1 0242935

(51) Int. Cl.
*H04M 11/02*    (2006.01)
*H04W 68/02*    (2009.01)
(Continued)

(52) U.S. Cl.
CPC ............ *H04M 11/022* (2013.01); *H04L 67/18* (2013.01); *H04W 4/005* (2013.01); *H04W 4/025* (2013.01);
(Continued)

(58) Field of Classification Search
CPC ... H04W 68/00; H04W 68/02; H04W 68/025; H04W 60/04; H04W 68/005; H04W 48/12; H04W 72/0466; H04W 84/027; H04W 36/0033
USPC ......................................... 455/458
See application file for complete search history.

(56) References Cited

U.S. PATENT DOCUMENTS

2009/0098890 A1*    4/2009    Vasudevan et al. ........... 455/458
2010/0081459 A1*    4/2010    Bosch et al. .................. 455/458
2012/0243422 A1*    9/2012    Jokimies ............... H04W 4/006
                                                                370/242

FOREIGN PATENT DOCUMENTS

CN    101001449 A    7/2007
CN    101374071 A    2/2009
(Continued)

OTHER PUBLICATIONS

Extended European Search Report in EP Application No. 12825794.6 dated Dec. 22, 2014, 8 pages.
(Continued)

*Primary Examiner* — Kwasi Karikari
(74) *Attorney, Agent, or Firm* — Marshall, Gerstein & Borun LLP

(57) ABSTRACT

Examples of the present disclosure provide a method and a device for communicating paging area information. A radio access network (RAN) side device can determine a smaller area for group paging by using information of a group paging area provided by a services capability server (SCS) and cell coverage information. Therefore, when users are managed in groups, paging areas determined can be more accurate, and paging efficiency can be increased, waste of resources resulted from performing group paging in a too-large paging area can be avoided. The mechanism can prevent random access of a large number of users who have received the group paging from overloading the RAN and from impacting conventional human-to-human (H2H) users.

10 Claims, 2 Drawing Sheets

(51) Int. Cl.
| | |
|---|---|
| H04W 68/10 | (2009.01) |
| H04W 4/00 | (2009.01) |
| H04W 4/20 | (2009.01) |
| H04L 29/08 | (2006.01) |
| H04W 4/02 | (2009.01) |
| H04W 4/06 | (2009.01) |
| H04W 84/02 | (2009.01) |
| H04W 88/18 | (2009.01) |

(52) U.S. Cl.
CPC ............... *H04W 4/20* (2013.01); *H04W 68/02* (2013.01); *H04W 68/025* (2013.01); *H04W 68/10* (2013.01); *H04W 4/06* (2013.01); *H04W 84/027* (2013.01); *H04W 88/185* (2013.01)

(56) References Cited

FOREIGN PATENT DOCUMENTS

| CN | 102291824 A | 12/2011 |
|---|---|---|
| EP | 1 571 856 A1 | 9/2005 |

OTHER PUBLICATIONS

First Office Action in CN Application No. 201110242935.7 dated May 14, 2013, 17 pages.
Second Office Action in CN Application No. 201110242935.7 dated Jul. 30, 2013, 9 pages.
"Further Considerations on Group Paging for MTC", 3GPP TSG-RAN WG2 #71 bis, Xian, China, Oct. 11-15, 2010, 4 pages.
"Group Paging for MTC Devices", 3GPP TSG-RAN2 Meeting #71, Madrid, Spain, Aug. 23-27, 2010, 3 pages.
"MTC RAN Impact Analysis", 3GPP TSG-RAN WG3#67, San Francisco, CA, Feb. 22-26, 2010, 6 pages.
"A Solution for Group Based Addressing", 3GPP TSG SA WG2 Meeting #79, Kyoto, Japan, May 10-14, 2010, 4 pages.
"Analysis of MTC Requirements on Identifiers", SA WG2 Meeting #86, Naantali, Finland, Jul. 11-15, 2011, 6 pages.
"3rd Generation Partnership Project; Technical Specification Group Services and System Aspects; Service Requirements for Machine-Type Communications; Stage 1", (Release 10), 3GPP TS 22.368 V1.2.2, Feb. 2010, 24 pages.
International Search Report for PCT/CN2012/079196 dated Nov. 1, 2012.

\* cited by examiner

METHOD AND DEVICE OF COMMUNICATING PAGING AREA INFORMATION

The present disclosure is a national phase application of international application PCT/CN2012/079196, which claims priority of Chinese patent application No. 201110242935.7 titled "method and device of communicating paging area information" and filed on Aug. 23, 2011 with the Patent Office of the People's Republic of China, the disclosure of which is incorporated by reference in its entirety.

TECHNICAL FIELD

The present disclosure relates to communications, and particularly to a method and a device of communicating paging area information.

BACKGROUND

Machine-type communication (MTC) is a novel communication concept for effectively integrating various different types of communication techniques, e.g., machine-to-machine communication, machine-controlled communication, human-machine interaction, mobile interconnection and communication to promote developments in production and life style. It is estimated that in future, human-to-human communication service may only occupy one third of the terminal market while the majority of the communications is occupied by MTC communications services. MTC communications is sometimes referred to as machine-to-machine (M2M) communication or the Internet of things.

Current mobile communications networks are designed for human-to-human (H2H) communications, e.g., in aspects such as determining network capacity. Mobile communication systems should be optimized according to characteristics of MTC communications before being used for MTC communications so as to better support MTC communications while making no or little impact on conventional human-to-human communications.

Characteristics of MTC communication identified at the current stage may include:

MTC devices have low mobility;

the time of MTC devices performing data transmission with network side devices is controllable;

data transmission between an MTC network and network side devices does not have high real time requirements, i.e., has time tolerance;

MTC devices have limited battery capacity, require extremely low power consumption;

MTC devices only perform transmission of small data with network side devices;

MTC devices may be managed in unit of group;

. . .

A physical MTC device may have at least one of the above characteristics.

When managing communications of a large number of M2M users, users having the same service characteristics may be classified into one group and managed in unit of group to improve management efficiency. For example, a group of users may be notified to submit data report. Third generation partnership project (3GPP) is discussing a possible mechanism, according to which a services capability server (SCS) instructs a core network to initiate paging of users in the group. A radio access network (RAN) transmits paging information to an air interface. M2M users in the group initiate a random access process after receiving the paging information to establish a communication link with the network and transmit data required.

According to the currently discussed mechanism of managing the submitting of data reports in unit of group, in order to void the network being congested by random access requests initiated by a large number of users in a group after receiving the group paging, the system may solve the problem by randomizing the time of access or by allocating dedicated physical random access channel (PRACH) to the M2M users to minimize impact on the access of H2H users.

In universal mobile telecommunications system (UMTS), the core network transmits paging messages to a radio network controller (RNC) through a radio access network application part (RANAP) on the control plane via an Iu interface (which is configured for exchanging signaling between the core network and the RNC). The scope of the paging is location area (LA)/routing area (RA). In long term evolution (LTE) systems, the core network transmits paging messages to an evolved NodeB (eNB, i.e., a base station) through an S1 application part (S1 AP) on the control plane of the S1 interface (the S1 interface provides connection between a radio network with the core network). The scope of the paging is tracking area (TA).

SUMMARY

Embodiments of the present disclosure provide a method and a device of communicating paging area information to solve the problem of conventional mechanisms incapable of accurately determining a paging area when users are managed in groups.

Examples of the present disclosure provide a method of communicating paging area information which may include:

a RAN device receives a control plane message sent by an SCS which includes information of a group paging area; and the RAN device determines a paging area of a to-be-initiated group paging by using the information of the group paging area.

Examples of the present disclosure also provide a RAN device which may include:

a receiving module, configured to receive a control plane message sent by an SCS which includes information of a group paging area; and a processing module, configured to determine a paging area of a to-be-initiated group paging by using the information of the group paging area received by the receiving module.

Examples of the present disclosure provide a method of communicating paging area information which may include:

an SCS sends a control plane message which includes information of a group paging area to a RAN device to enable the RAN device to determine a paging area for a to-be-initiated group paging by using the information of the group paging area.

Examples of the present disclosure also provide an SCS device which may include:

a sending module, configured to send a control plane message which includes information of a group paging area to a RAN device to enable the RAN device to determine a paging area for an to-be-initiated group paging by using the information of the group paging area.

Compared with the prior art, the mechanism of the present disclosure have the following merits.

According to the technical mechanism of examples of the present disclosure, the RAN side devices can determine a finer area of a group paging by using information of group paging area provided by an SCS and cell coverage information. Therefore, when users are managed in groups, paging areas determined can be more accurate, and paging efficiency can be increased, waste of resources resulted from performing group paging in a too-large paging area can be avoided. The mechanism can prevent random access of a large number of users who have received the group paging from overloading the RAN and from impacting conventional H2H users.

DETAILED DESCRIPTION

Machine to Machine communication is the trend of future intelligentization. The 3rd generation mobile communications systems and its long term evolution systems need to support MTC functions. But current communications networks are designed for human-to-human communications, e.g., regarding aspects such as system capacity, overload restriction schemes and the like. In an application scenario where there are a large amount of M2M communications, MTC terminals may outnumber conventional H2H terminals, e.g., the number of MTC terminals may be ten times or even a hundred times of the number of H2H terminals. In some cases (e.g., metering having identical service demands or the like), M2M users may be managed in groups. For example, an SCS is to perform identical processing for a group of M2M users, e.g., paging a group of M2M users to request the M2M users submit data reports, and the conventional paging scheme restricts the paging area to be LA/RA (UMTS) or TA (LTE). But the area from which the SCS expects to obtain data does not overlap with the LA/RA (UMTS) or TA (LTE), and may be far smaller than the LA/RA (UMTS) or TA (LTE). Thus, the efficiency of group paging is reduced, and resources may be unnecessarily wasted.

In view of the foregoing, examples of the present disclosure provide a method of communicating paging area information, according to which the paging area determined is more accurate when users are managed in groups.

Figure 1:
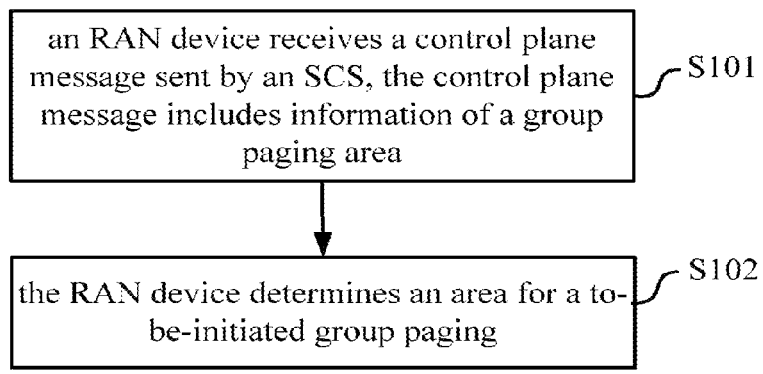
FIG. 1 is a flowchart illustrating a method of communicating paging area information in accordance with an example of the present disclosure.

FIG. 1 is a flowchart illustrating a method of communicating paging area information in accordance with an example of the present disclosure. The method may include the following procedures.

At block S101, a RAN device receives a control plane message which includes information of a group paging area and is sent by an SCS.

In an example, the control plane message may be forwarded by the core network. At this block, the RAN device may receive the control plane message sent by the SCS from a device in a core network.

In an example, the physical entity of the RAN device may vary according to system type, and the transporting process within the core network may also differ according to the system type. A few examples are described below.

(1) UMTS Systems

At this block, the RAN device may be an RNC, and the processing procedure may include: the RNC device receives the control plane message sent by the SCS forwarded by a device in the core network via an Iu interface.

In an example, the control plane message sent by the SCS may be a paging message conforming to the control plane RANAP protocol.

(2) LTE Systems

At this block, the RAN device may be an eNB, and the processing procedure may include: the eNB receives the control plane message sent by the SCS forwarded by a device in the core network via an S1 interface.

In an example, the control plane message sent by the SCS may be a paging message conforming to the control plane S1 AP protocol.

In order to transmit the information of the paging area correctly, the information of the group paging area in the control plane message may include the following two aspects of information:

A. information of an identity of a group to be paged in the group paging;

B. information of an area for the group paging.

In an example, the information of the area for the group paging may include any of the following information:

information of a circular area having a pre-defined radius with a pre-defined location as the center; or information of a fan-shaped area having a pre-defined radius with a pre-defined location as the center; or information of a rectangular area having a pre-defined length and a pre-defined width with a pre-defined location as a bearing point; or information of a serial number of an area in an area mapping table.

In various scenarios, other types of information may also be used as long as the same paging area can be determined, and such modifications do not affect the protection scope of the present disclosure.

At block S102, the RAN device determines a paging area of a to-be-initiated group paging by using the information of the group paging area.

In various examples, the procedure in this block may also vary according to different types of systems.

(1) UMTS Systems

At this procedure, the RAN device may be an RNC, and the processing procedure may include:

the RNC determines at least one cell in which the group paging is to be sent according to the information of the group paging area and cell distribution; and the RNC instructs at least one base station to initiate the group paging in the at least one cell via Iub interfaces (an Iub interface is an interface between the RNC and an eNB, configured for transmitting signaling between the RNC and the eNB and data from an air interface).

(2) LTE Systems

At this block, the RAN device may be an eNB, and the processing procedure may include: the eNB determines at least one cell in which the group paging is to be sent according to information of the group paging area and cell distribution information, and initiates the group paging in the at least one cell.

Therefore, differences in system types do not affect the protection scope of the present disclosure. If other system types can also implement the process of transmitting a control plane message which includes information of a group paging area from an SCS to an RAN device, the technical mechanisms are also applicable to such systems, and the variations do not affect the protection scope of the present disclosure.

Correspondingly, the SCS side may perform the processing of sending a control plane message which includes information of a group paging area to a RAN device. The manner of the sending and the manner of transporting the information of the group paging area are similar to the manners described above, and thus will not be described further herein.

Compared with the prior art, the mechanism of the present disclosure have the following merits.

According to the technical mechanism of examples of the present disclosure, the RAN side devices can determine a smaller area of a group paging by using information of group paging area provided by an SCS and cell coverage information. Therefore, when users are managed in groups, paging areas determined can be more accurate, and paging efficiency can be increased, waste of resources resulted from performing group paging in a too-large paging area can be avoided. The mechanism can prevent random access of a large number of users who have received the group paging from overloading the RAN and from impacting conventional H2H users.

The technical scheme provided by examples of the present disclosure is illustrated as follows by referring to several application scenarios.

In view of the drawback of conventional mechanisms described above, various examples of the present disclosure provide a solution for effectively determining cells to be paged by a RAN side device in case of group management, especially during group paging.

The technical scheme of an example may be as follows.

An SCS provides information of a group paging area to a RAN device via a core network, and the RAN device determines a cell or several cells for initiating paging according to the information. The information of the group paging area may include, but not limited to:

(1) a circle having a specific radius with a position (which may be represented by a longitude value and a latitude value or the like) as the center;

(2) a fan-shaped area having a specific radius with a position (which may be represented by a longitude value and a latitude value or the like) as the center;

(3) a rectangular area having a specific radius with a position (which may be represented by a longitude value and a latitude value or the like) as a bearing point;

(4) a serial number of an area in an area mapping table, or the like.

The RAN may determine at least one cell in which the paging is to be initiated by using the information of the paging area and cell distribution information.

Examples of the technical scheme applied to a UMTS system and an LTE system are described respectively.

Figure 2:
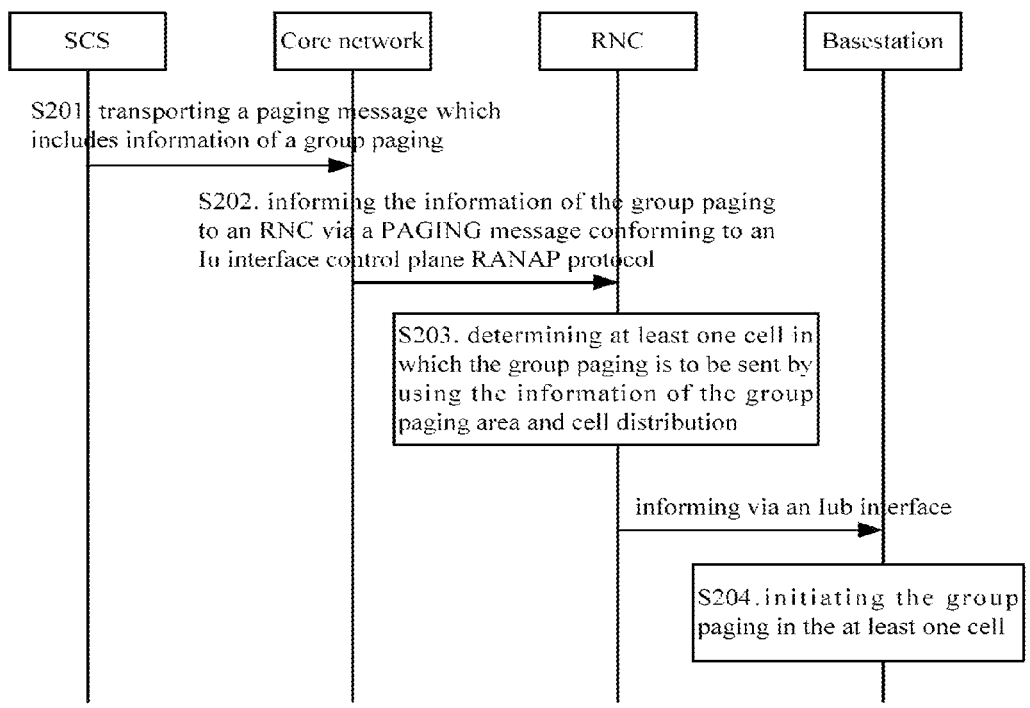
FIG. 2 is a flowchart illustrating a method of communicating paging area information in a UMTS network in accordance with an example of the present disclosure.

FIG. 2 is a flowchart illustrating a method of communicating paging area information in a UMTS system in accordance with an example of the present disclosure. The method may include the following procedures.

At block S201, an SCS sends a paging message which includes information of a group paging area to a core network.

At block S202, the core network sends the information of the group paging area to an RNC via a PAGING message conforming to Iu interface control plane RANAP protocol.

The information of the group paging area may include, but not limited to, information of an area at an absolute geographical location, or an index in an area mapping table, or the like.

In an example, a possible modification to the PAGING message conforming to a conventional RANAP protocol may be as shown in Table 1.

TABLE 1 components of a modified PAGING message conforming to the RANAP protocol

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| CN Domain Indicator | M | | 9.2.1.5 | | YES | ignore |
| Permanent NAS UE Identity | M | | 9.2.3.1 | | YES | ignore |
| Temporary UE Identity | O | | 9.2.3.2 | | YES | ignore |
| Paging Area ID | O | | 9.2.1.21 | | YES | ignore |
| Paging Cause | O | | 9.2.3.3 | | YES | ignore |
| Non Searching Indication | O | | 9.2.1.22 | | YES | ignore |
| DRX Cycle Length Coefficient | O | | 9.2.1.37 | | YES | ignore |
| Global CN-ID | O | | 9.2.1.46 | | YES | ignore |
| CSG Id List | | 0 to < maxnoofCSGId > | | | YES | ignore |
| >CSG Id | M | | 9.2.1.85 | | | |
| Group Paging Information | O | | | | | |
| >Group ID | O | | | the identity of the group to be paged | | |
| >Paging Area Info | O | | | information of a paging area of the group paging | | |
| >Paging Area Info | O | | | information of a paging area of the group paging | | |

In the above table, the underlined elements illustrate the manner of loading the information of the group paging area into a paging message. Other manners of arranging elements in the message may also be used as long as the same technical effect can be attained, and various variations of the message elements and arrangements of the elements do not affect the protection scope of the present disclosure.

At block S203, after receiving the information, the RNC determines at least one cell in which the group paging is to be sent by using the information of the group paging area and cell distribution information, and informs at least one base station corresponding to the at least one cell via an Iub interface.

At block S204, the at least one base station initiates the paging in the at least one cell.

Figure 3:
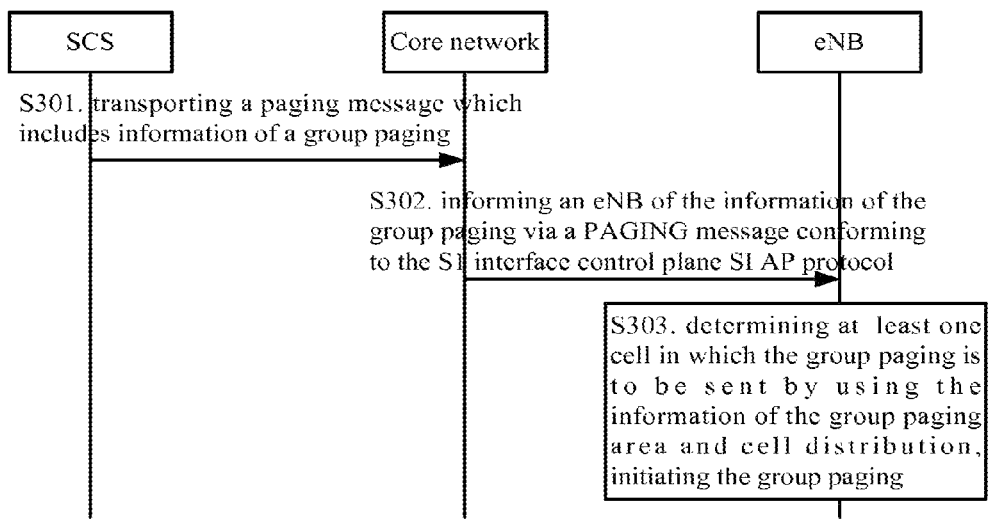
FIG. 3 is a flowchart illustrating a method of communicating paging area information in an LTE network in accordance with an example of the present disclosure.

FIG. 3 is a flowchart illustrating a method of communicating paging area information in an LTE system in accordance with an example of the present disclosure. The method may include the following procedures.

At block S301, an SCS sends a paging message which includes information of a group paging area to a core network.

At block S302, the core network sends the information of the group paging area to an eNB via a PAGING message conforming to an S1 interface control plane S1 AP protocol.

The information of the group paging area may include, but not limited to, information of an area at an absolute geographical location, or an index in an area mapping table, or the like.

In an example, a possible modification to the PAGING message conforming to a conventional S1 AP protocol may be as shown in Table 2.

sent by using the information of the group paging area and cell distribution, and initiates the paging process.

Compared with the prior art, the mechanism of the present disclosure have the following merits.

According to the technical mechanism of examples of the present disclosure, RAN side devices can determine a smaller paging area of a group paging by using information of group paging area provided by an SCS and cell coverage information. Therefore, when users are managed in groups, paging areas determined can be more accurate, and paging efficiency can be increased, waste of resources resulted from performing group paging in a too-large paging area can be avoided. The mechanism can prevent random access of a large number of users who have received the group paging from overloading the RAN and from impacting conventional H2H users.

Figure 4:
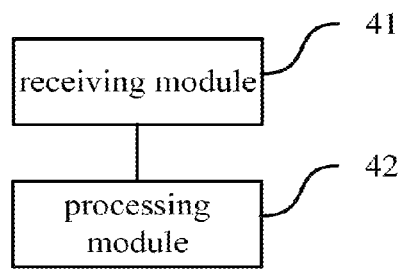
FIG. 4 is a schematic diagram illustrating modules of a RAN device in accordance with an example of the present disclosure.

Examples of the present disclosure also provide a RAN device. A structure of the RAN device is as shown in FIG. 4, and may include the following components.

A receiving module 41 may receive a control plane message sent by an SCS, wherein the control plane message includes information of a group paging area.

A processing module 42 may determine an area for a to-be-initiated group paging by using the information of the group paging area received by the receiving module 41.

The receiving module 41 may receive the control plane message sent by the SCS via a device in a core network.

In an example, the physical entity of the RAN device may vary according to system types, and the process of the information received by the receiving module 41 being transported within the core network may also differ according to the system types. A few examples are described below.

TABLE 2 components of a modified PAGING message conforming to the RANAP protocol

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| UE Identity Index value | M | | 9.2.3.10 | | YES | ignore |
| UE Paging Identity | M | | 9.2.3.13 | | YES | ignore |
| Paging DRX | O | | 9.2.1.16 | | YES | ignore |
| CN Domain | M | | 9.2.3.22 | | YES | ignore |
| List of TAIs | | 1 | | | YES | ignore |
| >TAI List Item | | 1 to < maxnoofTAIs > | | | EACH | ignore |
| >>TAI | M | | 9.2.3.16 | | — | |
| CSG Id List | | 0 . . . 1 | | | GLOBAL | ignore |
| >CSG Id | | 1 to < maxnoofCSGId > | 9.2.1.62 | | — | |
| Group Paging Information | O | | | | | |
| >Group ID | O | | | the identity of the group to be paged | | |
| >Paging Area Info | O | | | information of a paging area of the group paging | | |

In the above table, the underlined elements illustrate the manner of loading the information of the group paging area into a paging message. Other manners of arranging elements in the message may also be used as long as the same technical effect can be attained, and various variations of the message elements and arrangements of the elements do not affect the protection scope of the present disclosure.

At block S303, after receiving the information, the eNB determines at least one cell in which the group paging is to be In a UMTS network, the RAN device may be an RNC. The receiving module 41 may receive the control plane message sent by the SCS forwarded by a device in the core network via an Iu interface.

In an LTE network, the RAN device may be an eNB. The receiving module 41 may receive the control plane message sent by the SCS forwarded by a device in the core network via an S1 interface.

In example, the information of the group paging area included in the control plane message sent by the SCS may include information of an identity of a group to be paged and information of an area in which the group paging is to be performed.

The information of the area in which the group paging is to be performed may include:

information of a circular area having a pre-defined radius with a pre-defined location as the center; or information of a fan-shaped area having a pre-defined radius with a pre-defined location as the center; or information of a rectangular area having a pre-defined length and a pre-defined width with a pre-defined location as a bearing point; or information of a serial number of an area in an area mapping table.

In various examples, the processing procedure of the processing module 42 may also vary according to different types of systems.

In a UMTS network, the RAN device may be an RNC, and the processing module 42 may determine at least one cell in which the group paging is to be sent by using the information of the group paging area and cell distribution information.

In an LTE network, the RAN device may be an eNB, and the processing module 42 may determine at least one cell in which the group paging is to be sent by using the information of the group paging area and cell distribution information, and initiates the group paging in the at least one cell.

Figure 5:
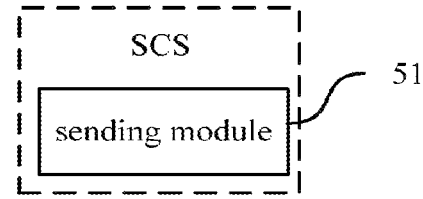
FIG. 5 is a schematic diagram illustrating modules of an SCS in accordance with an example of the present disclosure.

Examples of the present disclosure also provide an SCS. A structure of the SCS may be as shown in FIG. 5, and may include the following components.

A sending module 51 may send a control plane message which includes information of a group paging area to a RAN device to enable the RAN device to determine an area for a to-be-initiated group paging by using the information of the group paging area.

The sending module 51 may send the control plane message which includes the information of the group paging area via a core network device.

In an example, the physical entity of the RAN device may vary according to system types, and the process of the information sent by the sending module 51 being transported within the core network may also be different according to the system types. A few examples are described below.

In a UMTS network, the sending module 51 may send the control plane message which includes the information of the group paging area via a device in a core network to an RNC via an Iu interface.

In an LTE network, the sending module 51 may send the control plane message which includes the information of the group paging area via a device in the core network to an eNB via an S1 interface.

In an example, the information of the group paging area in the control plane message sent by the SCS may include information of an identity of a group to be paged and information of an area in which the group paging is to be performed.

The information of the area in which the group paging is to be performed may include:

information of a circular area having a pre-defined radius with a pre-defined location as the center; or information of a fan-shaped area having a pre-defined radius with a pre-defined location as the center; or information of a rectangular area having a pre-defined length and a pre-defined width with a pre-defined location as a bearing point; or information of a serial number of an area in an area mapping table.

Compared with the prior art, the mechanism of the present disclosure have the following merits.

According to the technical mechanism of examples of the present disclosure, RAN side devices can determine a smaller area of a group paging by using information of group paging area provided by an SCS and cell coverage information. Therefore, when users are managed in groups, paging areas determined can be more accurate, and paging efficiency can be increased, waste of resources resulted from performing group paging in a too-large paging area can be avoided. The mechanism can prevent random access of a large number of users who have received the group paging from overloading the RAN and from impacting conventional H2H users.

Through the above description, those skilled in the art may understand that the examples of the present disclosure may be implemented by hardware or by a general-purpose hardware platform together with software. Therefore, the technical scheme provided by the embodiments may be in the form of a software product which may be stored in a non-transient storage medium (e.g., a CD-ROM, a flash disk, a mobile hard disk, etc.) and includes several instructions to cause a computer (e.g., a PC, a server, a network device, etc.) to execute the methods provided by embodiments of the present disclosure for various application scenarios.

Those skilled in the art should understand each of the drawings are merely a schematic diagrams of an embodiment, and not all the modules and the procedures in the drawings are necessary for implementing the present disclosure.

Those skilled in the art can understand the modules in the apparatus of embodiments of the present disclosure may be located in the apparatus as described in the embodiments, or may be located in one or more apparatuses of the embodiments of the present disclosure when modified accordingly. The modules in embodiments of the present disclosure may be combined into one module, or may be further divided into multiple sub modules.

The index numbers of the embodiments are merely for facilitating description, and should not be interpreted to be representative for the preference order of the embodiments.

The foregoing is only some embodiments of the present disclosure. The protection scope of the present disclosure, however, is not limited to the above description. Any change or substitution that is within the scope disclosed by the present disclosure and can easily occur to those skilled in the art should be covered by the protection scope of the present disclosure.

The invention claimed is:

1. A method for communicating group paging information, the method comprising:

receiving, by a radio access network (RAN) device, a control plane message sent by a services capability server (SCS) which includes information describing a geographical area which serves as a group paging area in which group paging is to be performed; and determining, by the RAN device, at least one cell in which the group paging is to be sent by using cell distribution and the information describing the geographical area;

wherein receiving by a RAN device a control plane message sent by a SCS which includes information describing a geographical area comprises:

receiving, by a radio network controller (RNC) in a universal mobile telecommunications system (UMTS) network, the control plane message sent by the SCS forwarded by a device in a core network via an Iu interface;

wherein the control plane message sent by the SCS is a paging message conforming to a control plane S1 application part (S1 AP) (RANAP) protocol.

2. The method of claim 1, wherein the control plane message sent by the SCS further comprises:
information of an identity of a group to be paged in the group paging.

3. The method of claim 1, wherein the information describing the geographical area comprises:
information of a circular area having a pre-defined radius with a pre-defined location as a center; or
information of a fan-shaped area having a pre-defined radius with a pre-defined location as a center; or
information of a rectangular area having a pre-defined length and a pre-defined width with a pre-defined location as a bearing point; or
information of a serial number of the geographical area in an area mapping table.

4. The method of claim 1, wherein determining by the RAN device at least one cell in which the group paging is to be sent by using cell distribution and the information describing the geographical area comprises:
determining, by a radio network controller (RNC) in a universal mobile telecommunications system (UMTS) network, the at least one cell in which the group paging is to be sent according to the information and the cell distribution; and
instructing, by the RNC, at least one base station via an Iub interface to initiate the group paging in the at least one cell.

5. A radio network controller (RNC) in a universal mobile telecommunications system (UMTS) network, comprising:
a receiving module, configured to receive a control plane message sent by a services capability server (SCS) which includes information describing a geographical area which serves as a group paging area in which group paging is to be performed; and
a processing module, configured to determine at least one cell in which the group paging is to be sent by using cell distribution and the information describing the geographical area received by the receiving module;
wherein the receiving module receives the control plane message sent by the SCS forwarded by a device in a core network via an Iu interface;
wherein the control plane message sent by the SCS is a paging message conforming to a control plane radio access network application part (RANAP) protocol.

6. The RNC of claim 5, wherein the information describing the geographical area comprises:
information of a circular area having a pre-defined radius with a pre-defined location as a center; or
information of a fan-shaped area having a pre-defined radius with a pre-defined location as a center; or
information of a rectangular area having a pre-defined length and a pre-defined width with a pre-defined location as a bearing point; or
information of a serial number of the geographical area in an area mapping table.

7. The RNC of claim 5, wherein
the processing module determines at least one cell in which the group paging is to be sent by using the information and the cell distribution.

8. A method for communicating group paging information, the method comprising:
sending, by a services capability server (SCS), a control plane message which includes information describing a geographical area in which the group paging is to be performed which serves as a group paging area to a radio access network (RAN) device to enable the RAN device to determine at least one cell in which the group paging is to be sent by using the information and cell distribution;
wherein the sending by an SCS a control plane message which includes information describing the geographical area to a RAN device via the device in the core network comprises:
sending, by the SCS, the control plane message which includes the information to a radio network controller (RNC) via a device in a core network device via an Iu interface in a universal mobile telecommunications system (UMTS) network;
wherein the control plane message sent by the SCS is a paging message conforming to a control plane radio access network application part (RANAP) protocol.

9. The method of claim 8, wherein the control plane message sent by the SCS further comprises:
information of an identity of a group to be paged in the group paging.

10. The method of claim 8, wherein the information describing the geographical area comprises:
information of a circular area having a pre-defined radius with a pre-defined location as a center; or
information of a fan-shaped area having a pre-defined radius with a pre-defined location as a center; or
information of a rectangular area having a pre-defined length and a pre-defined width with a pre-defined location as a bearing point; or
information of a serial number of the geographical area in an area mapping table.

* * * * *